US012580092B2

(12) United States Patent
Garzon

(10) Patent No.: US 12,580,092 B2
(45) Date of Patent: Mar. 17, 2026

(54) COLLIMATOR AND METHODS OF FORMING SAME

(71) Applicant: SMITHS DETECTION INC., Edgewood, MD (US)

(72) Inventor: Pedro Andres Garzon, Santa Clara, CA (US)

(73) Assignee: SMITHS DETECTION INC., Edgewood, MD (US)

( * ) Notice: Subject to any disclaimer, the term of this patent is extended or adjusted under 35 U.S.C. 154(b) by 348 days.

(21) Appl. No.: 18/029,574

(22) PCT Filed: Sep. 29, 2021

(86) PCT No.: PCT/US2021/052704

§ 371 (c)(1),
(2) Date: Mar. 30, 2023

(87) PCT Pub. No.: WO2022/072535

PCT Pub. Date: Apr. 7, 2022

(65) Prior Publication Data

US 2023/0360818 A1 Nov. 9, 2023

Related U.S. Application Data

(60) Provisional application No. 63/086,221, filed on Oct. 1, 2020.

(51) Int. Cl.
*G21K 1/02* (2006.01)

(52) U.S. Cl.
CPC ......... *G21K 1/02* (2013.01); *G21K 2201/067* (2013.01)

(58) Field of Classification Search
CPC .... G21K 1/02; G21K 2201/067; G21K 1/025; G01N 23/04
USPC ........................................................ 250/505.1
See application file for complete search history.

(56) References Cited

U.S. PATENT DOCUMENTS

| | | | |
|---|---|---|---|
| 6,707,884 | B1 | 3/2004 | Ogawa |
| 6,957,913 | B2 | 10/2005 | Renkart et al. |
| 7,893,413 | B1 | 2/2011 | Appleby et al. |
| 2007/0096030 | A1 | 5/2007 | Li et al. |
| 2011/0081004 | A1 | 4/2011 | Harding et al. |

(Continued)

FOREIGN PATENT DOCUMENTS

DE 10011877 A1 * 9/2001 ............. G21K 1/025

OTHER PUBLICATIONS

European Extended Search Report, Application No. 21876418.1, dated Dec. 9, 2024, 10 pps.

(Continued)

*Primary Examiner* — Michael Maskell
(74) *Attorney, Agent, or Firm* — Armstrong Teasdale LLP

(57) ABSTRACT

A collimator includes a collimator cover formed from a material with low radiation attenuation, and a plurality of septa formed from a radiation attenuating material. The collimator cover includes a base plate, a first side plate extending from the base plate, and a second, opposing side plate extending from the base plate. The first side plate has a plurality of first slots defined therein and the second side plate has a plurality of second slots defined therein. Each septum includes a first end retained in one first slot of the plurality of first slots and a second end retained in one corresponding second slot of the plurality of second slots.

18 Claims, 6 Drawing Sheets

(56) References Cited

U.S. PATENT DOCUMENTS

| | | | | |
|---|---|---|---|---|
| 2012/0087462 | A1 | 4/2012 | Ikhlef | |
| 2013/0322603 | A1* | 12/2013 | Kurochi | G21K 1/025 378/147 |

OTHER PUBLICATIONS

PCT International Search Report and Written Opinion, Application No. PCT/US2021/052704, dated Dec. 27, 2021, 6 pages.

* cited by examiner

COLLIMATOR AND METHODS OF FORMING SAME

CROSS-REFERENCE TO RELATED APPLICATIONS

This application is a national stage application of PCT/US2021/052704, filed on Sep. 29, 2021, which claims priority to U.S. Provisional Patent Application No. 63/086,221, filed on Oct. 1, 2020, both of which are incorporated herein by reference in their entirety.

BACKGROUND

The embodiments described herein relate generally to x-ray imaging systems, such as computed tomography (CT) systems and, more particularly, to collimators having machinable, covers with low x-ray attenuation for use with x-ray systems.

X-ray collimators are an intrinsic part of x-ray-based imaging systems, such as CT imaging systems. These collimators filter and direct scattered x-ray beams to the x-ray detectors. Some known collimators include a plurality of septa or walls to perform this filter/directing function. The septa must be precisely placed at a desired angle, and must be relatively small.

Known techniques for manufacturing collimators use casting lead in a mold with a series of unique cores corresponding to the desired series of septa. The cores are placed by hand to ensure proper placement, and the resulting septa are relatively thick to maintain rigidity thereof. Other techniques include precisely placing thin tungsten plates at different angles in machine plates. However, this method requires high precision in placing the tungsten plates (e.g., at the proper angle and alignment) and can involve complex post-processing steps, which collectively increase the cost of the collimator.

BRIEF DESCRIPTION

In one aspect, a collimator is provided. The collimator includes a collimator cover formed from a material with low radiation attenuation, and a plurality of septa formed from a radiation attenuating material. The collimator cover includes a base plate, a first side plate extending from the base plate, and a second, opposing side plate extending from the base plate. The first side plate has a plurality of first slots defined therein and the second side plate has a plurality of second slots defined therein. Each septum includes a first end retained in one first slot of the plurality of first slots and a second end retained in one corresponding second slot of the plurality of second slots.

In another aspect, a method of forming a collimator is provided. The method includes providing a sheet of material with low radiation attenuation, forming a plurality of slots in the sheet, bending the sheet to form a collimator cover including a base plate and a pair of opposing side plates extending from the base plate, wherein each side plate of the pair of side plates includes a subset of the plurality of slots defined therein, providing a plurality of septa, and positioning the plurality of septa within the collimator cover by locating the plurality of septa in the plurality of slots.

In a further aspect, a method of forming a detector assembly is provided. The method includes providing a sheet of material with low radiation attenuation, forming a plurality of slots in the sheet, bending the sheet to form a collimator cover including a base plate and a pair of opposing side plates extending from the base plate, wherein each side plate of the pair of side plates includes a subset of the plurality of slots defined therein, providing a plurality of septa, and positioning the plurality of septa within the collimator cover by locating the plurality of septa in the plurality of slots, to form a collimator. The method also includes coupling the formed collimator to a plurality of detector elements, and coupling a shield to the formed collimator and the plurality of detector elements.

In yet another aspect, a detector assembly is provided. The detector assembly includes a collimator including a collimator cover formed from a material with low radiation attenuation, and a plurality of septa formed from a radiation attenuating material. The collimator cover includes a base plate, a first side plate extending from the base plate, and a second, opposing side plate extending from the base plate. The first side plate has a plurality of first slots defined therein and the second side plate has a plurality of second slots defined therein. Each septum includes a first end retained in one first slot of the plurality of first slots and a second end retained in one corresponding second slot of the plurality of second slots. The detector assembly also includes a plurality of detector elements, and a shield.

In a still further aspect, a collimator cover formed from a material with low radiation attenuation is provided. The collimator cover includes a base plate, a first side plate extending from the base plate, and a second, opposing side plate extending from the base plate. The first side plate has a plurality of first slots defined therein and the second side plate has a plurality of second slots defined therein, wherein each of said first slots is aligned with a corresponding second slot, and wherein said plurality of first slots and said plurality of second slots are sized and oriented to receive a plurality of septa formed from a radiation attenuating material

DETAILED DESCRIPTION

The present disclosure provides systems and methods for forming collimators for use, for example, in detector assemblies of x-ray (e.g., CT) imaging systems. The collimator of the present disclosure is formed from a sheet of x-ray transparent material, such as aluminum, which is laser cut and folded into a "U-shaped" collimator cover. More specifically, the sheet is laser cut with an outer profile suitable for folding to form the collimator cover, and also with a plurality of slots configured to retain thin tungsten plates therein, when the collimator is formed and assembled. Using the sheet material enables the high precision, high throughput, and relatively lower production costs of laser-cutting, and the folding process improves the strength and structural integrity of the collimator cover without added thickness (e.g., minimizing the amount of material needed for the cover).

Figure 1:
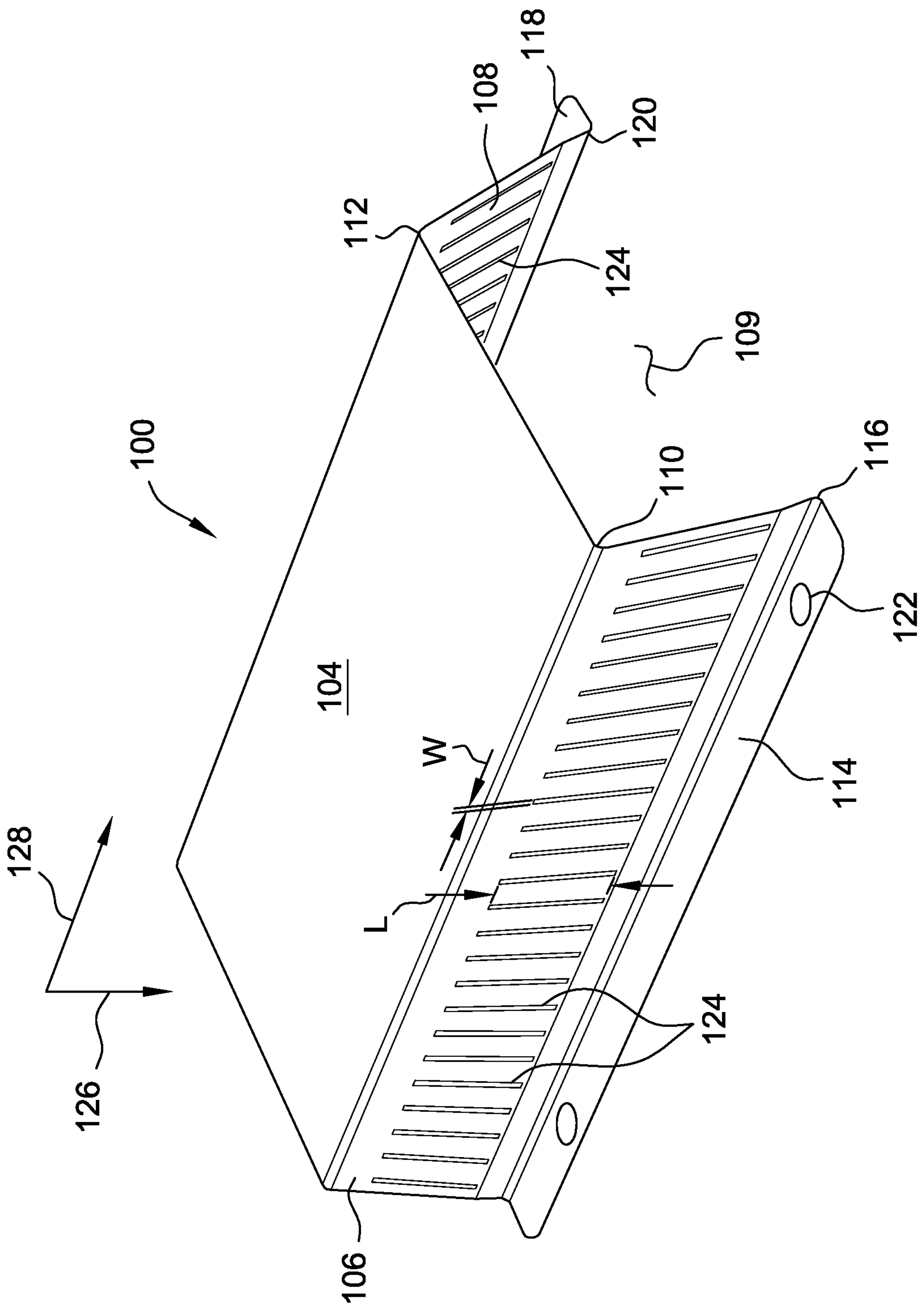
FIG. 1 depicts an exemplary collimator cover in accordance with the present disclosure.
Figure 2:
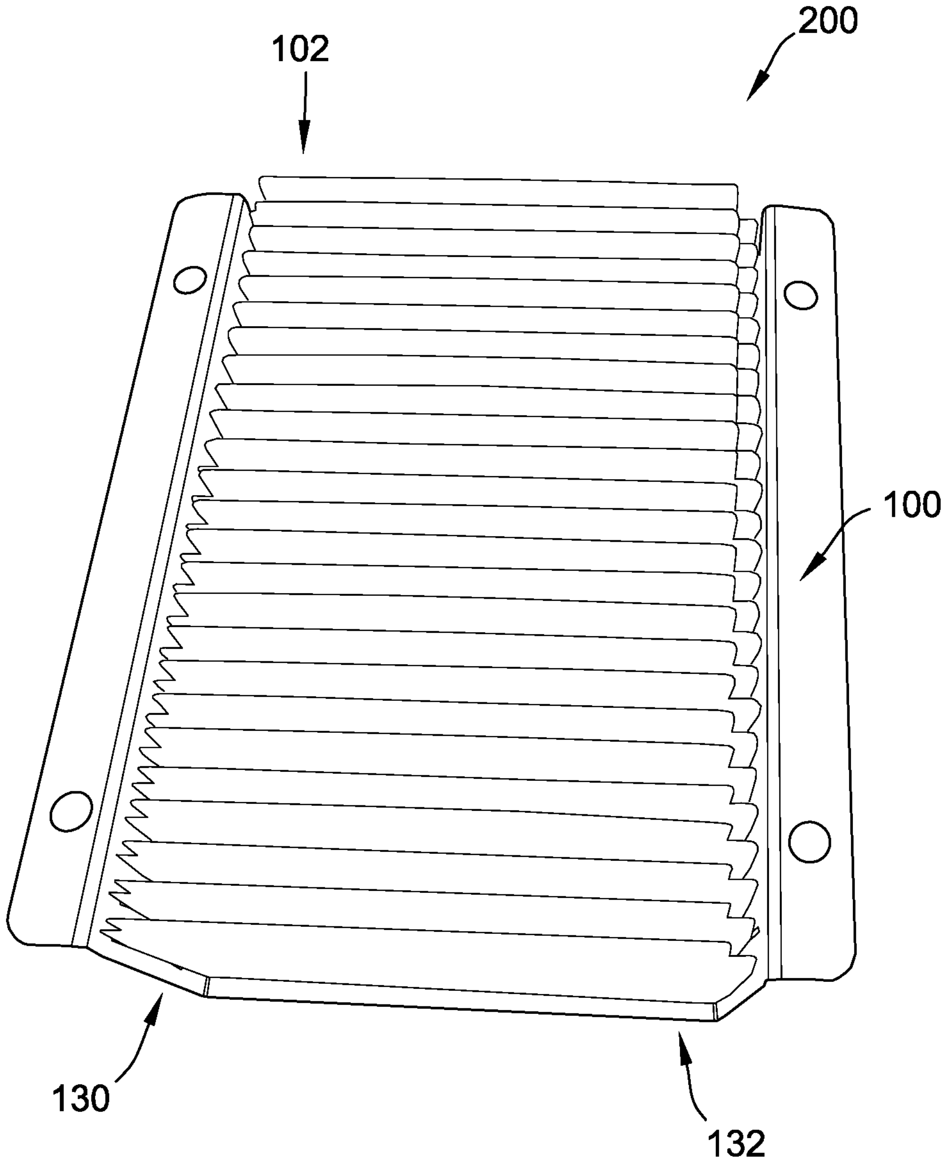
FIG. 2 depicts an exemplary collimator including the cover shown in FIG. 1 and a plurality of plates or septa.

Turning now to the figures, FIG. 1 depicts an exemplary collimator cover 100 for use in a collimator 200, as shown in FIG. 2, of a detector assembly. In the exemplary embodiment, cover 100 is generally "U-shaped" to accommodate a plurality of thin plates or septa 102 (see FIG. 2) therein, as described further herein. More particularly, cover 100 includes a base plate 104 and opposing first and second side plates 106, 108 that extend from base plate 104 at respective fold lines or corners 110, 112. Base plate 104 and side plates 106, 108 collectively define a trough or longitudinally extending cavity 109 therebetween.

Side plates 106, 108 extend from base plate 104 at an angle between about 90° to about 100°, such that side plates 106, 108 "flare" out from base plate 104. This orientation (e.g., side plates 106, 108 at an oblique angle with respect to base plate 104) may facilitate easier placement of septa 102 in trough 109, as described further herein. In other embodiments, side plates 106, 108 are substantially perpendicular to base plate 104.

A first flange 114 extends from first side plate 106 at a fold line or corner 116 opposite from base plate 104, and is substantially parallel to base plate 104. First flange 114 may extend from first side plate 106 at any suitable angle, such as, for example, 90° to 100°. Likewise, a second flange 118 extends from second side plate 108 at a fold line or corner 120, and is substantially parallel to base plate 104. Second flange 118 may extend from second side plate 108 at any suitable angle, such as, for example, 90° to 100°. Flanges 114, 118 include one or more openings 122 defined therethrough, for receiving fasteners therein, as described further herein.

Corners 110, 112, 116, 120 are depicted as relatively "sharp" corners, but it should be understood that any of corners 110, 112, 116, 120 may be tapered, rounded, or otherwise shaped, based upon the particular forming and folding process used to form cover 100, as described further herein.

Cover 100 is formed from a material with low x-ray attenuation, such as aluminum, or any other material with low x-ray attenuation. Moreover, in the exemplary embodiment, cover 100 is formed from a thin sheet of such material, having a thickness of about 0.010 inches (in) to 0.20 in. In the exemplary embodiment, cover 100 is a unitary component. That is, base plate 104, side plates 106, 108, and flanges 114, 118 are integrally formed with one another (e.g., from the same sheet of material). It is contemplated that, in an alternative embodiment, side plates 106, 108 may be separately formed and coupled to base plate 104 to form cover 100.

Each of first side plate 106 and second side plate 108 has defined therethrough a plurality of slots 124. In particular, each side plate 106, 108 includes any suitable number of slots 124 to accommodate the number of septa 102 in cover 100, where the number of septa 102 (and, thereby, slots 124) is proportional to the number of detector rows or columns in a detector array in which collimator 200 is used. In the exemplary embodiment, slots 124 are oriented parallel to one another. In other embodiments, one or more of slots 124 may have any angle or orientation relative to any other slot 124. In the exemplary embodiment, slots 124 have a length L proportional to a field of view (FOV) and focal spot position of the x-ray imaging system (e.g., the CT system) in which collimator 200 is implemented, and a width W that is related to a thickness of septa 102 (e.g., to provide a tight fit when septa 102 are received in slots 124). That is, some dimensions of slots 124 are selected based upon the dimensions of septa 102 to be positioned and retained therein. Moreover, in the exemplary embodiments, each slot 124 on first side plate 106 is opposite to and aligned with a corresponding slot 124 on second side plate 108.

With reference to FIGS. 1 and 2, slots 124 in side plates 106, 108 cooperate to retain septa 102 within cover 100, in particular, within cavity 109. Specifically, a first end 130 of each septum or plate 102 is positioned and retained within a corresponding slot 124 defined through first side plate 106, and a second end 132 of each septum or plate 102 is positioned and retained within a corresponding slot 124 on second side plate 108. Septa 102, in the exemplary embodiment, are thin, generally rectangular plates formed from an x-ray attenuating material such as tungsten, antimony, or tin. Septa 102 have dimensions related to the geometry of the x-ray imaging system (e.g., CT system) in which collimator 200 is implemented, to account for positions of the focal spot, detector array, and FOV.

Cover 100 and septa 102, collectively, form collimator 200. In operation (e.g., when collimator 200 is coupled to a detector assembly for use in an x-ray imaging system), x-ray beams travel through collimator 200 in a "vertical" direction 126 (e.g., orthogonal to a longitudinal direction 128 of collimator 200) between gaps formed between adjacent septa 102. Thereby, the x-rays beams are directed onto detector elements for detection thereof.

Figure 3:
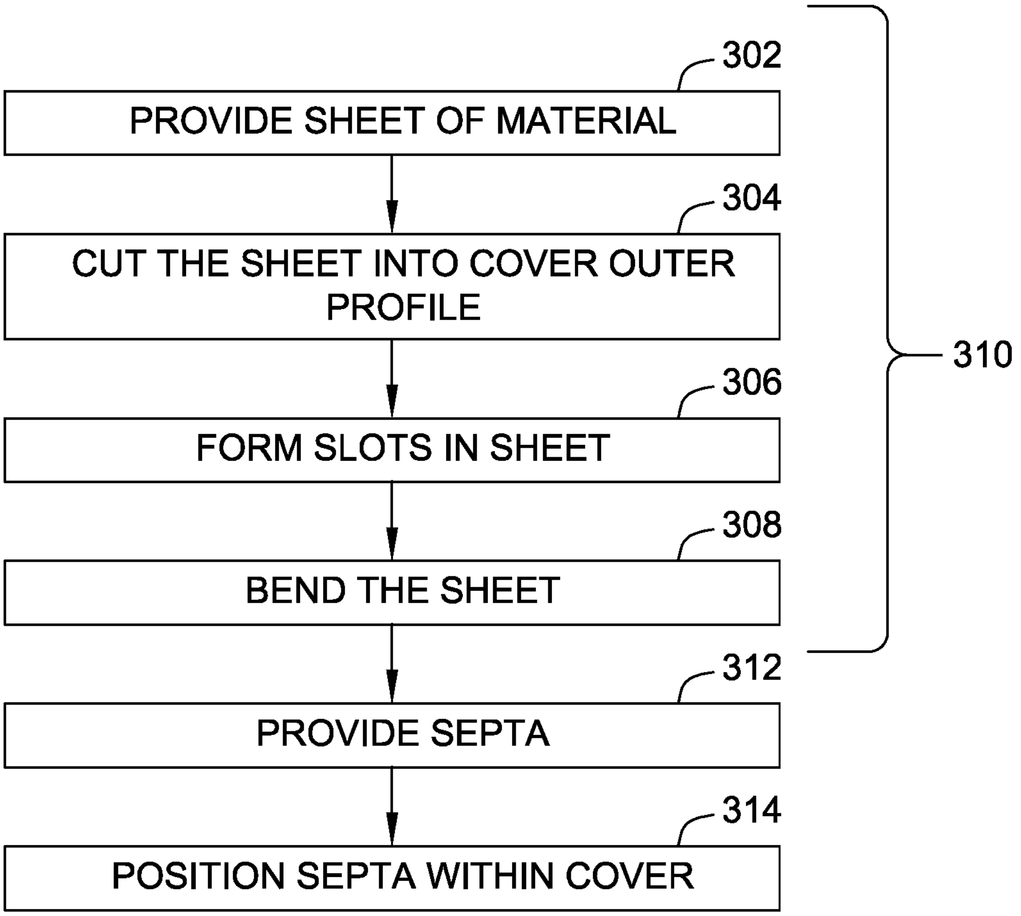
FIG. 3 is a flow diagram of a method for forming a collimator in accordance with the present disclosure.

FIG. 3 is a flow diagram of a method 300 of forming a collimator, such as collimator 200, in accordance with the present disclosure. Method 300 includes providing 302 a sheet of material. The material, as described herein, is an x-ray transparent or transmissive material, or a material with low x-ray attenuation, such as aluminum. Moreover, the sheet is relatively thin, for example, as compared to the thick lead castings of some known collimators. Method 300 may include cutting 304 (e.g., laser-cutting) the sheet into an outer profile of the collimator cover (e.g., cover 100). In other embodiments, the sheet may already be sized and shaped with the outer profile of the collimator cover.

Method 300 further includes forming 306 slots (e.g., slots 124) in the sheet. In the exemplary embodiment, the slots are formed 306 using laser-cutting techniques, such that the slots are formed 306 with high precision. That is, the number, dimension(s), position, and orientation of any slot(s) may be precisely selected and implemented using laser cutting techniques. The slots may alternatively be formed 306 using other cutting methods or techniques, such as etching, stamping, and the like. Forming 306 includes, in some embodiment, selecting a number of slots to cut, and/or selecting the dimensions/position/orientation (e.g., angle) of the slots. In some embodiments, the slots are formed 306 after the sheet is cut 304 into the outer profile of the cover; in other embodiments, the slots are formed 306 before the sheet is cut 304.

Thereafter, the sheet (optionally, cut 304) is bent 308 to define a base plate (e.g., base plate 104) and opposing side plates (e.g., side plates 106, 108) including the plurality of slots defined therein. In some embodiments, the sheet is bent 308 around a mandrel, to define the shape and angle of the corners (e.g., corners 110, 112) between the base plate and the side plates, which can affect the relative strength of the formed cover. Bending 308 may further include bending 308 the side plates to form flanges (e.g., flanges 114, 118) extending from the side plates. After bending 308 is completed, the cover is considered formed—that is, steps 302-308 may be collectively referred to as a cover-forming process 310.

To form the collimator, a plurality of septa (e.g., septa 102) are provided 312. The septa are arranged in a predetermined pattern, based on the formed 306 slots, within the cover. Specifically, the septa are positioned 314 within the cover by locating the septa within the slots to form the collimator. In some embodiments, the formed collimator is integrated 316 within a detector assembly, as described further herein.

Figure 4:
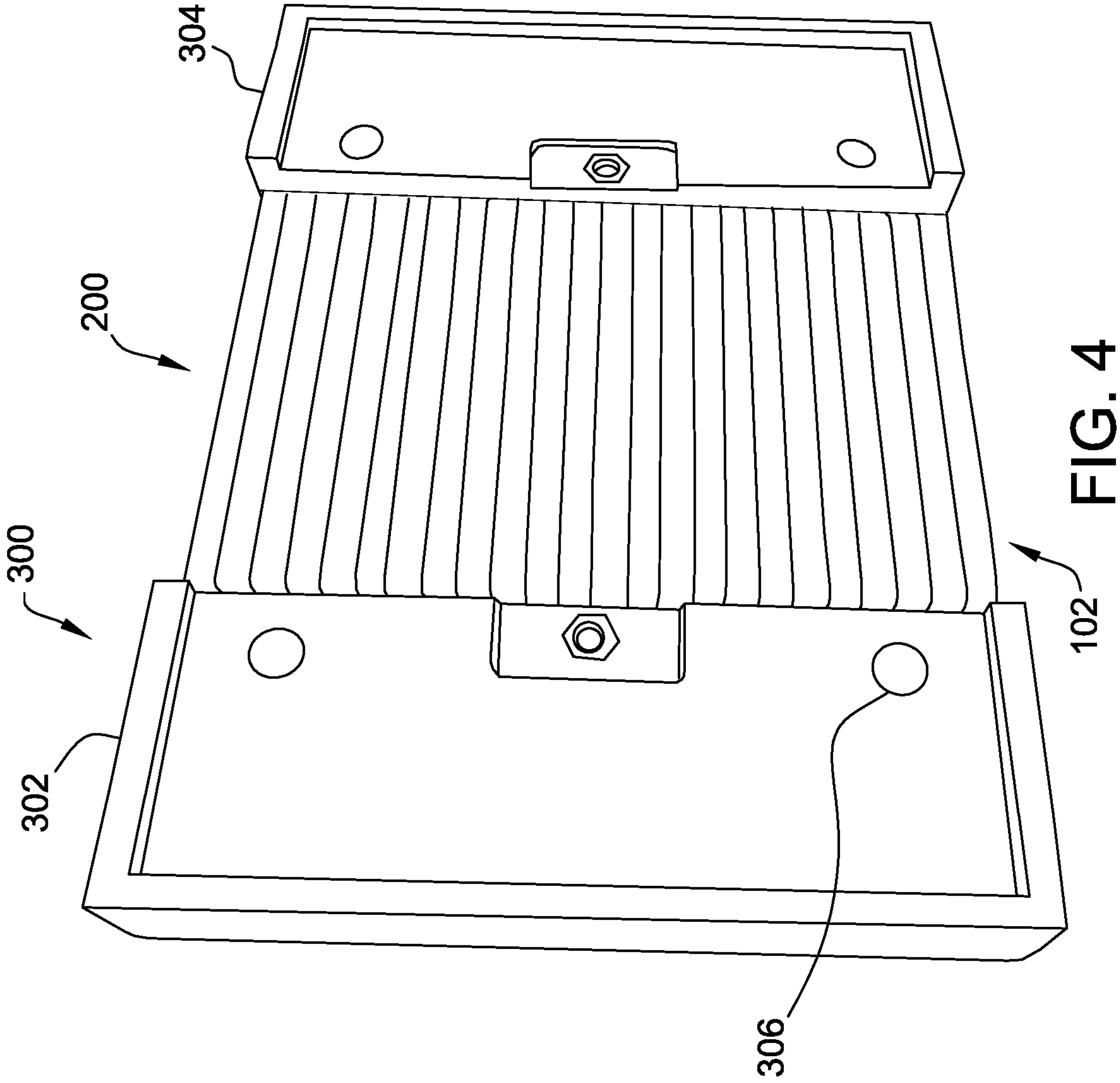
FIG. 4 depicts a partially formed detector assembly including the collimator shown in FIG. 2.

Specifically, FIG. 4 depicts a partially formed detector assembly 400 including collimator 200 shown in FIG. 2. Collimator 300 is coupled to a pair of mounting members 302, 304. For example, fasteners (e.g., screws, not shown) are installed through openings 122 in flanges 114, 118 and through corresponding openings 306 in mounting members 302, 304.

Figure 5:
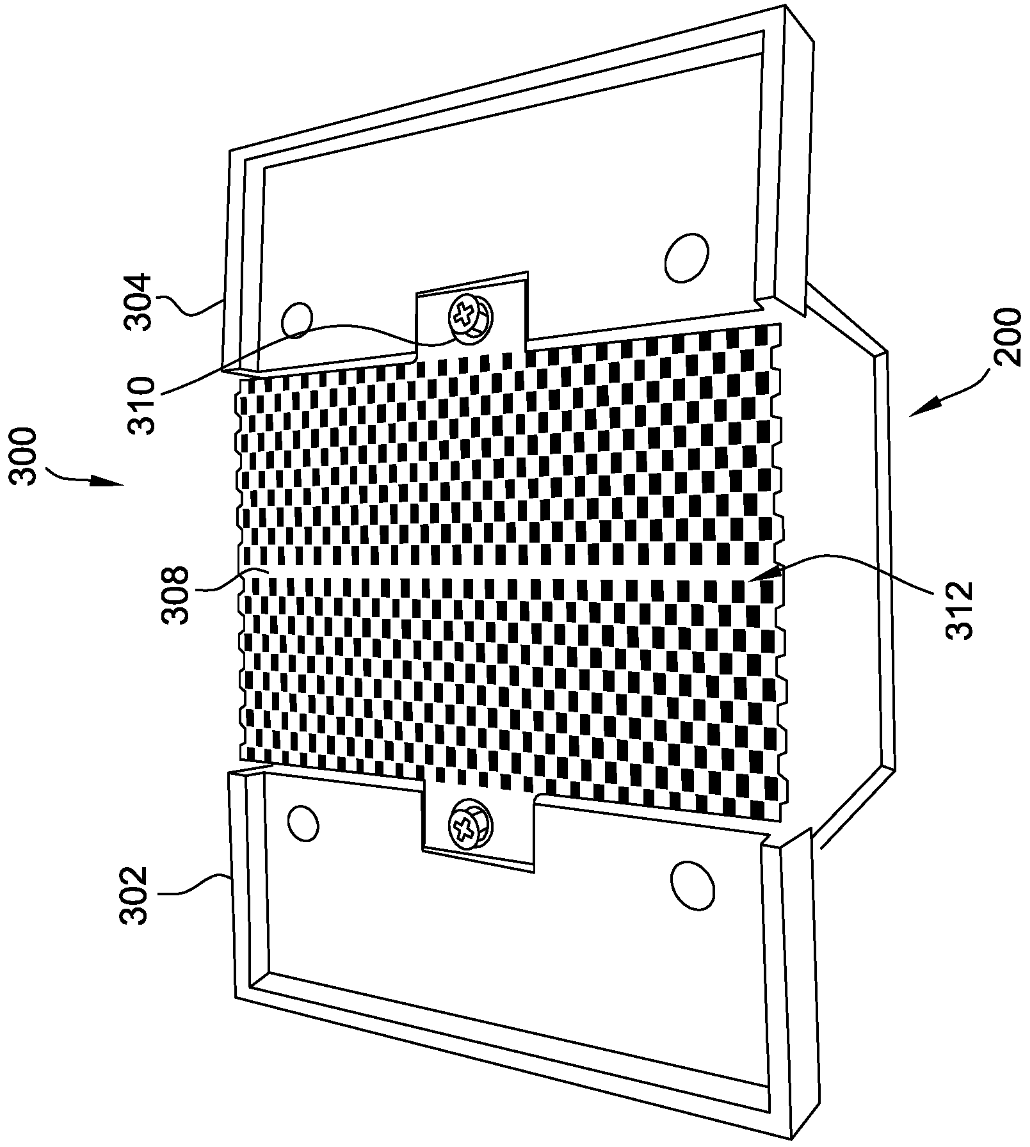
FIG. 5 depicts a further formed detector assembly.

FIG. 5 depicts a bottom perspective view of a further assembled detector assembly 300. At least one checkerboard plate 308 is coupled to collimator 200 and/or to mounting members 302, 304. For instance, fasteners 310 (e.g., screws) couple checkboard plate 308 to mounting members 302, 304. Checkboard plate 308 is a copper plate configured to transmit x-rays within selected energy ranges, based upon the size and/or pattern of openings 312 therethrough. Specifically, the solid portions of checkboard plate 308 attenuate but still pass x-rays therethrough, such that x-rays of different energies pass through the solid portions than pass through openings 312.

Figure 6:
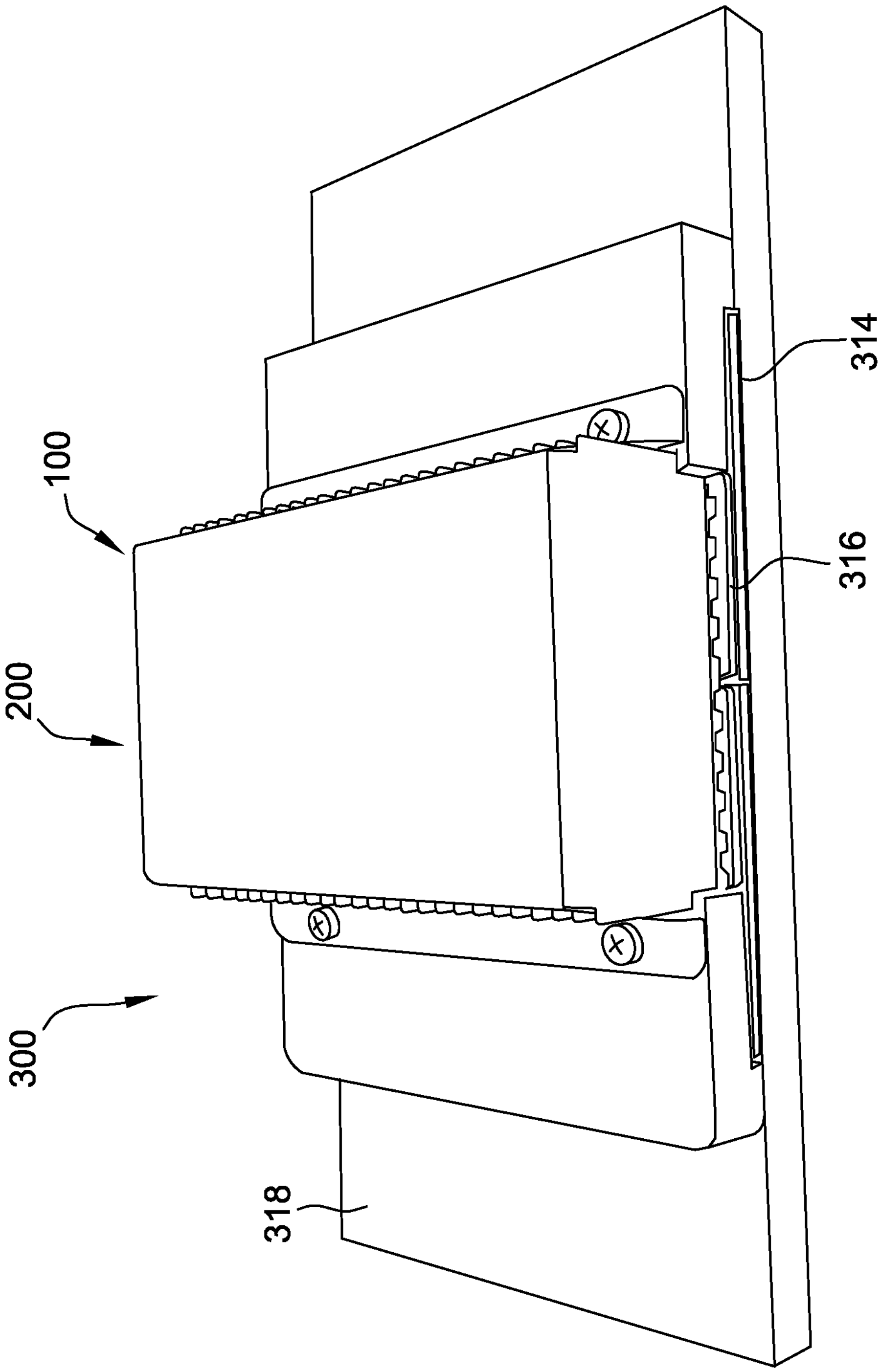
FIG. 6 depicts a further formed detector assembly.

FIG. 6 depicts a further formed detector assembly 300. Collimator 200 is mounted to a substrate 314 including detector elements 316 coupled thereto, and is further mounted to a shielding member 318 via mounting members 302, 304. Shielding member 318 (e.g., a top shield of a fully formed detector assembly, not shown) is configured to attenuate or block unwanted x-rays from reaching detector elements 316 (e.g., other than through collimator 200).

The above-described systems and methods facilitate efficiently manufacturing precise and low-cost collimators for detector assemblies. The collimator cover is laser-cut and bent from a sheet of material with low x-ray attenuation, enabling high-throughput when forming the covers while maintaining precision in placement of septa therein, and without sacrificing strength or structural integrity of the collimator.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A collimator comprising:

a collimator cover formed from a unitary sheet of material with low radiation attenuation, said collimator cover comprising:

a base plate:

a first side plate extending from said base plate; and a second, opposing side plate extending from said base plate, wherein said first side plate has a plurality of first slots defined therein and said second side plate has a plurality of second slots defined therein; and a plurality of septa formed from a radiation attenuating material, wherein each septum comprises a first end retained in one first slot of the plurality of first slots and a second end retained in one corresponding second slot of the plurality of second slots.

2. The collimator of claim 1, wherein the material with low radiation attenuation comprises aluminum.

3. The collimator of claim 1, wherein the radiation attenuating material comprises tungsten.

4. The collimator of claim 1, wherein the plurality of first slots are oriented parallel to one another.

5. The collimator of claim 1, wherein dimensions of each of the plurality of first and second slots is selected to correspond to dimensions of a respective septum of said plurality of septa.

6. The collimator of claim 1, wherein said collimator cover further comprises:

a first flange extending from said first side plate opposite said base plate; and a second flange extending from said second side plate opposite said base plate.

7. A method of forming a collimator, said method comprising:

providing a sheet of material with low radiation attenuation:

forming a plurality of slots in the sheet;

bending the sheet to form a collimator cover including a base plate and a pair of opposing side plates extending from the base plate, wherein each side plate of the pair of side plates includes a subset of the plurality of slots defined therein:

providing a plurality of septa; and positioning the plurality of septa within the collimator cover by locating the plurality of septa in the plurality of slots.

8. The method of claim 7, further comprising cutting the sheet into an outer profile of the collimator cover before or after forming the plurality of slots in the sheet.

9. The method of claim 7, further comprising bending each side plate of the pair of side plates to form a respective flange extending from the respective side plate.

10. The method of claim 7, further wherein each side plate includes half of the plurality of slots defined therein.

11. The method of claim 7, wherein dimensions of each slot of the plurality of slots correspond to respective dimensions of the plurality of septa.

12. The method of claim 7, wherein providing the sheet comprises providing a sheet of aluminum.

13. The method of claim 7, wherein providing the plurality of septa comprises providing a plurality of tungsten septa.

14. A method of forming a detector assembly, said method comprising:

performing the method according to claim 8 to form a collimator;

coupling the formed collimator to a plurality of detector elements; and coupling a shield to the formed collimator and the plurality of detector elements.

15. A detector assembly comprising:

the collimator according to claim 1;

a plurality of detector elements; and a shield.

16. A collimator cover formed from a material with low radiation attenuation, said collimator cover comprising:

a unitary sheet of the material with low radiation attenuation forming:

a base plate;

a first side plate extending from said base plate; and a second, opposing side plate extending from said base plate, wherein said first side plate has a plurality of first slots defined therein and said second side plate has a plurality of second slots defined therein, wherein each of said first slots is aligned with a corresponding second slot, and wherein said plurality of first slots and said plurality of second slots are sized and oriented to receive a plurality of septa formed from a radiation attenuating material.

17. The collimator cover of claim 16, wherein the material with low radiation attenuation comprises aluminum.

18. The collimator cover of claim 16, wherein the plurality of first slots are oriented parallel to one another.

* * * * *